United States Patent
Nguyen et al.

(10) Patent No.: US 7,480,244 B2
(45) Date of Patent: *Jan. 20, 2009

(54) APPARATUS AND METHOD FOR SCALABLE CALL-PROCESSING SYSTEM

(75) Inventors: Nhut Nguyen, Richardson, TX (US); Matt Wu, Plano, TX (US); Rosa Lin, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 779 days.

This patent is subject to a terminal disclaimer.

(21) Appl. No.: 10/897,818

(22) Filed: Jul. 23, 2004

(65) Prior Publication Data

US 2006/0018304 A1    Jan. 26, 2006

(51) Int. Cl.
*G01R 31/08* (2006.01)
(52) U.S. Cl. ............... 370/235; 370/237; 370/352; 379/133; 709/223
(58) Field of Classification Search .......... 370/235, 370/237, 352; 379/133; 709/223
See application file for complete search history.

(56) References Cited

U.S. PATENT DOCUMENTS

2002/0156900 A1* 10/2002 Marquette et al. ........... 709/227
2004/0244001 A1* 12/2004 Haller et al. ................. 718/100

* cited by examiner

*Primary Examiner*—Quynh H Nguyen

(57) ABSTRACT

For use in a telecommunication node, a scalable call-processing system is provided to process signaling messages in a distributed processing environment. The call-processing system includes: (i) processing nodes operable to process signaling messages, each of the processing nodes configured to monitor a respective loading factor and produce respective real-time loading information; (ii) resource server nodes operable to provide resources to the processing nodes, each of the resource server nodes configured to monitor a respective loading factor and produce respective real-time loading information; and a load-sharing manager connected to receive the real-time loading information from each of the processing nodes and each of the resource server nodes, the load-sharing manager further connected to receive the signaling messages and distribute the signaling messages to the processing nodes for processing using the resource server nodes based on load-sharing rules generated using programmable policies and the real-time loading information.

20 Claims, 4 Drawing Sheets

APPARATUS AND METHOD FOR SCALABLE CALL-PROCESSING SYSTEM

TECHNICAL FIELD OF THE INVENTION

The present invention is generally directed to telecommunication networks and, more specifically, to scalable call-processing system within a distributed call-processing environment.

BACKGROUND OF THE INVENTION

In modern telecommunication systems, a call-processing system is responsible for processing call requests received from the network. Call requests are received by the call-processing system via signaling messages. For instance, in a wireless communications network, a voice and/or data call request from a mobile station is sent as an air interface message to a serving base station, which in turn transmits the air interface message to a mobile switching center (MSC) via signaling links connecting the base station to the MSC. The call request is processed in the call-processing system of the MSC.

The capacity requirement for a call-processing system varies depending on the call traffic generated by the network. For example, in metropolitan areas, a high capacity call-processing system may be needed, while in rural areas, a smaller capacity call-processing system may be sufficient. However, due to population growth and the general trend of migration from rural areas to metropolitan areas, scalable call-processing systems that allow capacity fluctuation as requirements change are desirable to both the manufacturer and call-processing system operator. For manufacturers, scalable call-processing systems translate into minimal development costs. For operators, scalable call-processing systems translate into lower procurement and operating costs.

In order to provide increased capacity, conventional call-processing systems have recently been designed as distributed computing environments in which processing power is provided by multiple processing nodes. For instance, a distributed call-processing system has been developed that shares a common memory space containing all available call-processing resources between the multiple processing nodes. However, the scalability of such a system is limited by the bandwidth of the memory space. Another available distributed call-processing system partitions the call-processing functions between the multiple processing nodes. Scalability is difficult to achieve in such a system due to the complexity of redistributing traffic when a new processing node is added to the system.

Therefore, there is a need in the art for an improved scalable call-processing system and method for use in a distributed processing environment.

SUMMARY OF THE INVENTION

The present invention provides a scalable call-processing system and method for processing signaling messages in a distributed processing environment. The scalable call-processing system and method includes multiple processing nodes for processing the signaling messages and multiple resource server nodes providing resources useable by each of the processing nodes.

The scalable call-processing system and method uses a load-sharing manager for managing and balancing the traffic load between the multiple processing nodes and multiple resource server nodes. Loading information for each processing node and each resource server node is appended to processing messages transmitted from the processing nodes and resource server nodes. The processing messages are routed through the load-sharing manager, which extracts the loading information from the processing messages. The loading information is used in conjunction with programmable policies to generate load-sharing rules used by the load-sharing manager to route incoming signaling messages to the processing nodes and assign resource server nodes for the signaling messages that are required for a call.

To address the above-discussed deficiencies of the prior art, it is a primary object of the present invention to provide, for use in a telecommunication network, a telecommunication node includes a scalable call-processing system. According to an advantageous embodiment of the present invention, the call-processing system comprises: (i) processing nodes operable to process signaling messages, each of the processing nodes configured to monitor a respective loading factor and produce respective real-time loading information; (ii) resource server nodes operable to provide resources to the processing nodes, each of the resource server nodes configured to monitor a respective loading factor and produce respective real-time loading information; and a load-sharing manager connected to receive the real-time loading information from each of the processing nodes and each of the resource server nodes, the load-sharing manager further connected to receive the signaling messages and distribute the signaling messages to the processing nodes for processing using the resource server nodes based on load-sharing rules generated using programmable policies and the real-time loading information.

According to one embodiment of the present invention, the programmable policies include a threshold for the real-time loading information associated with one or more of the processing nodes and the resource server nodes.

According to another embodiment of the present invention, the real-time loading information for the processing nodes is appended to response messages sent from the processing nodes to the load-sharing manager.

According to yet another embodiment of the present invention, the real-time loading information for the resource server nodes is appended to response messages sent from the processing nodes or the resource server nodes to the load-sharing manager.

According to a further embodiment of the present invention, the load-sharing manager further comprises: (i) a distribution controller connected to receive the signaling messages and distribute the signaling messages to the processing nodes the said load-sharing rules; (ii) a rules generator configured to receive the programmable policies and the real-time loading information for each of the processing nodes and each of the resource server nodes and to generate the load-sharing rules therefrom; and (iii) a load analyzer operable to receive the response messages, extract the real-time loading information from the response messages and provide the real-time loading information to the rules generator.

According to still a further embodiment of the present invention, the load-sharing manager is configured to select one of the processing nodes and one of the resource server nodes for one of the signaling messages based on the load-sharing rules.

According to a still further embodiment of the present invention, the processing nodes comprise substantially the same processing logic and provide substantially the same functionality.

According to an additional embodiment of the present invention, each of the resource server nodes provides a different resource.

According to still an additional embodiment of the present invention, two or more of the resource server nodes provides the same resource.

According to yet an additional embodiment of the present invention, each of the resource server nodes is useable by more than one of the processing nodes.

Before undertaking the DETAILED DESCRIPTION OF THE INVENTION below, it may be advantageous to set forth definitions of certain words and phrases that may be used throughout this patent document. The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1-4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunication network.

Figure 1:
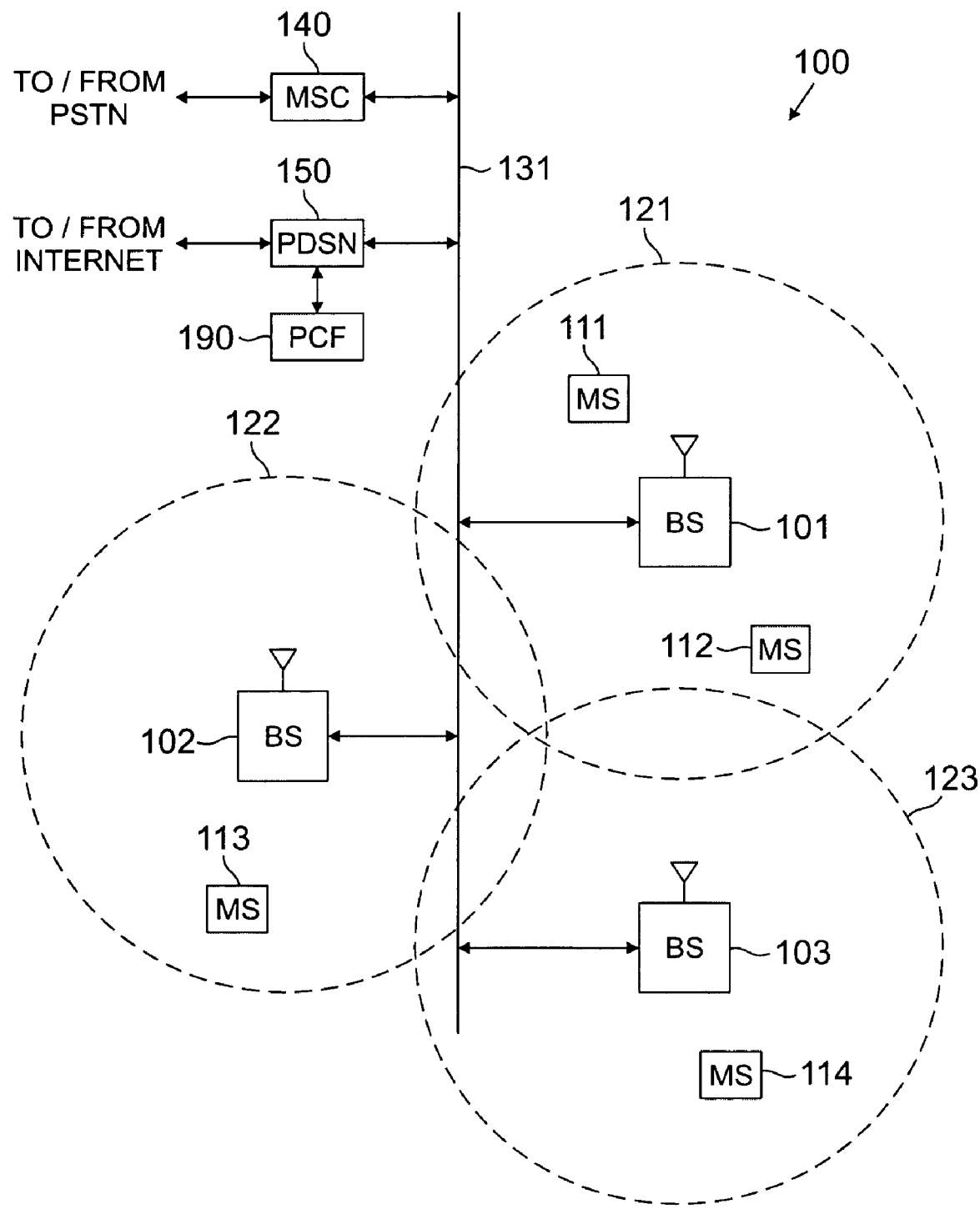
FIG. 1 illustrates an exemplary wireless network in which a telecommunication node can be implemented using a scalable distributed call-processing system according to the principles of the present invention.

FIG. 1 illustrates exemplary wireless network 100, in which a telecommunication node can be implemented as a scalable distributed processing environment to process signaling messages according to the principles of the present invention.

Wireless network 100 comprises a plurality of cell sites 121-123, each containing one of the base stations, BS 101, BS 102, or BS 103. Base stations 101-103 communicate with a plurality of mobile stations (MS) 111-114 over air interface (wireless) channels. For example, air interface channels may be code division multiple access channels according to the IS-2000-C standard (i.e., Release C of cdma2000) Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1.

MSC 140 is an exchange that performs switching and signaling functions for mobile stations 112, 113 and 114. For example, one of the functions of MSC 140 is to process call requests from mobile stations 112, 113 and 114 and coordinate the setting up of calls to and from mobile stations 112, 113 and 114. Thus, MSC 140 provides services and coordination between the subscribers in a wireless network and external networks, such as the PSTN or Internet. MSC 140 is well known to those skilled in the art.

Line 131 also provides the connection path for control signals transmitted between MSC 140 and BS 101, BS 102 and BS 103 that establish connections for voice and data circuits between MSC 140 and BS 101, BS 102 and BS 103. Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like. In some embodiments of the present invention, communications line 131 may be several different data links where each data link couples one of BS 101, BS 102, or BS 103 to MSC 140.

According to the principles of the present invention, MSC 140 is capable of operating using a scalable, distributed call-processing system for processing call requests for mobile stations 112, 113 and 114 that implements a load-sharing feature to manage the processing capacity and resources in the distributed call-processing system. Call requests from mobile stations 112, 113 and 114 or from other subscribers destined for mobile stations 112, 113 and 114 received at MSC 140 are processed by one of multiple processing nodes within the distributed call-processing system of MSC 140.

Figure 2:
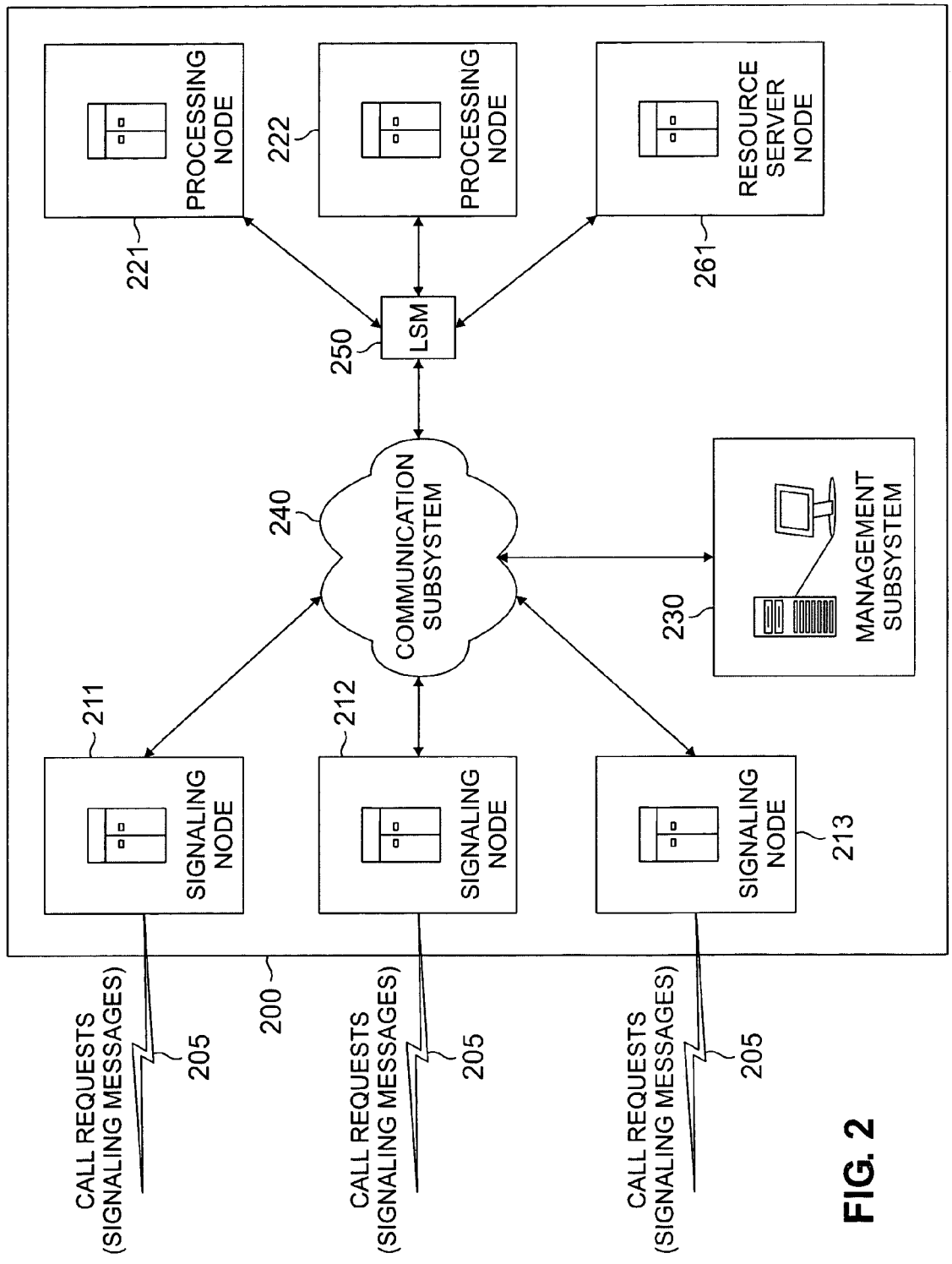
FIG. 2 illustrates an exemplary distributed call-processing system according to the principles of the present invention.

FIG. 2 illustrates exemplary distributed call-processing system 200, which implements load-sharing features according to the principles of the present invention. Distributed call-processing system 200 can be implemented in any call-processing telecommunication node. For example, such call-processing telecommunication nodes include any type of wireline switch, wireless switch (MSC 140), router or call server. Distributed call-processing system 200 comprises signaling nodes 211-213, processing nodes 221-222, resource server node 261, management subsystem 230, and communication subsystem 240. Signaling nodes 211-213 receive signaling messages 205 (e.g., call requests) from external devices (not shown) and route received signaling messages 205 to processing nodes 221-222 via communication subsystem 240. For example, communication subsystem 240 can be an Ethernet system.

Processing nodes 221-222 perform call-processing functions upon receiving signaling messages 205 from signaling nodes 211-213 via communication subsystem 240. Processing nodes 221-222 are hetereogeneous or uniform in nature, meaning that each processing node 221-222 includes substantially the same processing logic and provides substantially the same functionality as any other processing node 221-222. As a result, processing nodes 221-222 can be easily added or removed from call-processing system 200 with minimal effect on the processing capacity or functionality of any of the existing processing nodes 221-222 or resource server nodes 261.

Processing nodes 221-222 utilize call-processing resources that reside on one or more resource server nodes 261 to perform the call-processing functions. For example, call-processing resources can include audio resources, video resources, announcement resources or any other type of resource used during call processing. For simplicity, only one resource server node 261 is shown in FIG. 2. However, it should be understood that multiple resource server nodes (not shown) may be available in call-processing system 200. Each resource server node 261 may provide a different type of resource, or multiple resource server nodes 261 may provide the same type of resource. Each resource server node 261 is useable by any processing node 221-222, and is capable of servicing more than one processing node 221-222 simultaneously.

Load-sharing manager (LSM) 250 routes signaling messages 205 to processing nodes 221-222 and assigns resource server nodes 261 to assist processing nodes 221-222 in processing signaling messages 205. LSM 250 maintains loading information for each processing node 221-22 and resource server node 261 in call-processing system 200. Using the loading information and programmable policies, LSM 250 routes signaling messages 205 to the optimum processing node 221 or 222 for the signaling message and assigns the optimum resource server node 261 to assist the optimum processing node 221 or 222.

For example, a call typically consists of two call halves, each representing a party involved in the call. The two call halves are closely related and usually require information from each other. For efficiency and performance purposes, LSM 250 can ensure that the same processing node 221 or 222 handles both call halves of the call. As another example, since LSM 250 maintains loading information for all of the processing nodes 221-222 within the call-processing system 200, LSM can implement load distribution policies that ensure that the load (e.g., used or unused processing capacity or percentage of used or unused resources) is balanced between processing nodes 221-222 and balanced between resource server nodes 261 providing the same resource.

Management subsystem 230 operates to manage signaling nodes 211-213, resource server node 261, processing nodes 221-222 and load-sharing manager 250 and updates the load-sharing manager 250 when changes to the configuration of call-processing system 200 occur. For example, management subsystem 230 controls the addition or removal of one or more signaling nodes 211-213, processing nodes 221-222 and/or resource server nodes 261 within distributed call-processing system 200.

Figure 3:
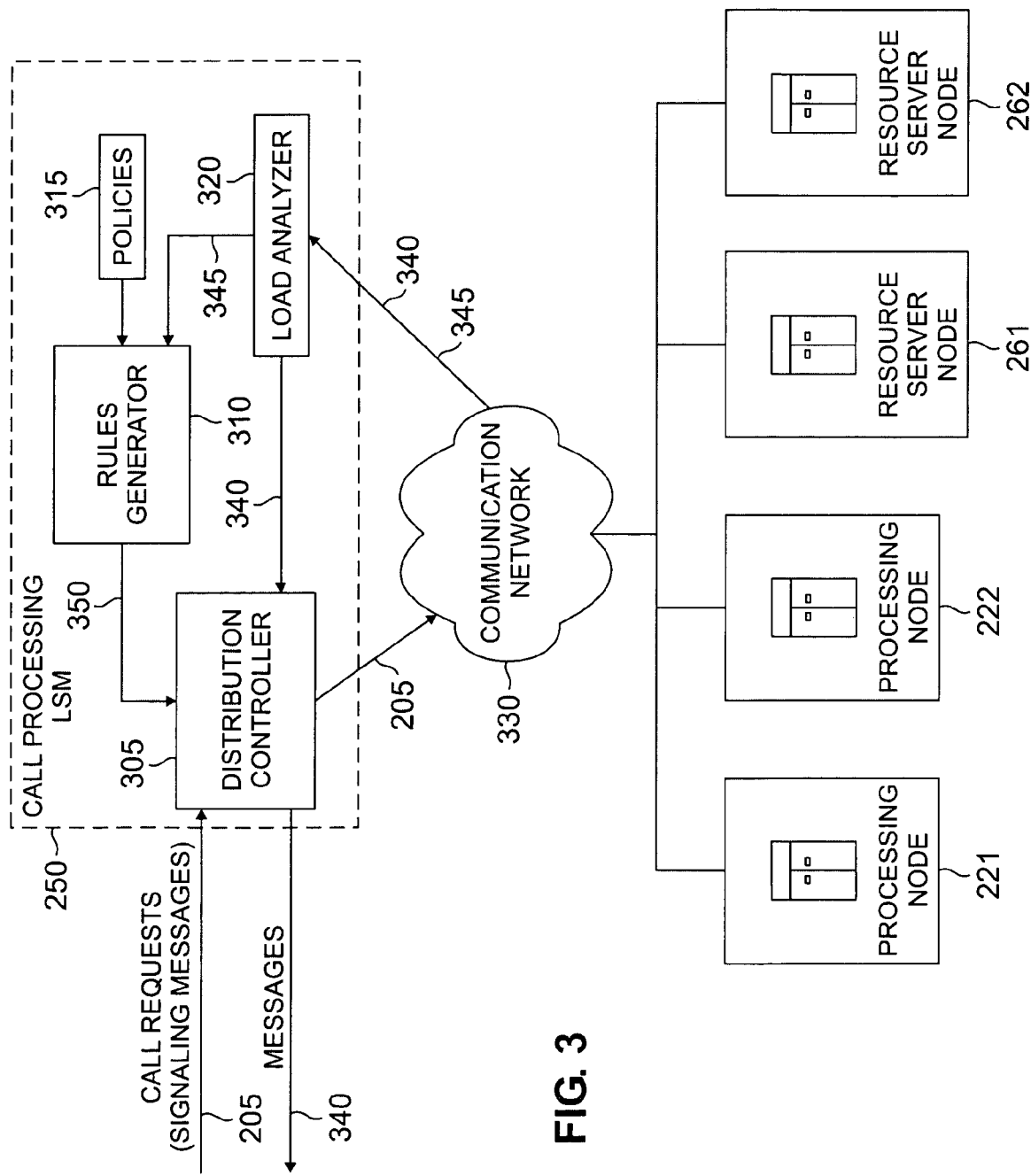
FIG. 3 illustrates an exemplary load-sharing manager of the distributed call-processing system in greater detail according to the principles of the present invention.

FIG. 3 illustrates exemplary load-sharing manager (LSM) 250 in greater detail according to the principles of the present invention. LSM 250 comprises a plurality of functional blocks, including distribution controller 305, rules generator 310 and load analyzer 320. Distribution controller 305 processes incoming signaling messages (call requests) 205 and selects a respective optimum processing node (e.g., processing node 221 or 222) for processing each signaling message 205. If resources are needed to process the signaling message 205, distribution controller further determines the optimum resource server node (e.g., resource server node 261 or 262) and assigns the optimum resource server node 261 or 262 for the signaling message 205. Distribution controller routes each signaling message 205 to the respective optimum processing node 221 or 222 via communication network 330.

Distribution controller 305 determines the optimum processing node 221 or 222 and optimum resource server node 261 or 262 for each signaling message 205 using information provided by rules generator 310 and load analyzer 320. Rules generator 310 utilizes a list of programmable policies 315 to generate rules 350 that control the operation of distribution controller 305. For example, policies 315 may be related to efficiency, load-sharing or other processing factors as determined by the operator of call-processing system. For policies 315 that are related to load-sharing, load analyzer 320 provides to rules generator 310 real-time loading information 345 for each processing node 221-222 and resource server node 261-262 within the distributed processing environment. Loading information 345 and policies 315 are used by rules generator 310 to generate rules 350 that control the distribution of signaling messages 205 to processing nodes 221-222 and assignment of resource server nodes 261-262 by distribution controller 305.

According to one embodiment of the present invention, policies 315 include one or more thresholds 335 for real-time loading information 345 for both processing nodes 221-222 and resource server nodes 261-262. For example, policies 315 for processing node 221 may include a threshold above which signaling messages are not sent to processing node 221. Thus, when the loading information 345 for processing node 221 exceeds the threshold, rules generator 310 compares the loading information 345 of processing node 221 to the policies 315 for processing node 221 and generates a rule 350 to distribution controller 305 that prevents distribution controller 305 from sending any new signaling messages 205 to processing node 221.

As another example, rules generator 310 may compare loading information 345 for each processing node 221 and 222 with policies 315 associated with one or more processing nodes 221-222 to determine which processing node to route the signaling message 205 to. Therefore, it should be understood that policies 315 may be associated only with a single processing node 221 or resource server node 261 or with multiple processing nodes 221-222 or resource server nodes 261-262.

Loading information 345 is dynamically updated in real-time by each of the processing nodes 221-222 and resource server nodes 261-262 via communication network 330. Each processing node 221-222 and resource server node 261-262 constantly measures it's loading factors and produces respective loading information 345 related to the loading factors. For example, loading information 345 may include capacity information indicating the percentage of processing power or resources currently in use or currently available. As another example, loading information 345 may include the number of call requests the processing node 221 or resource server node 261 is currently handling.

Loading information 345 is appended to each message 340 sent by processing nodes 221-222 and resource server nodes 261-262. Messages 340 are routed through load analyzer 320 of LSM 250 via communication network 330 before being routed to a destination network element. Load analyzer 320 receives message 340 with appended loading information 345, extracts loading information 345 from message 340 and inputs loading information 345 to rules generator 310. Load analyzer 320 further forwards message 340 to distribution controller 305 for routing to the destination network element for message 340.

Figure 4:
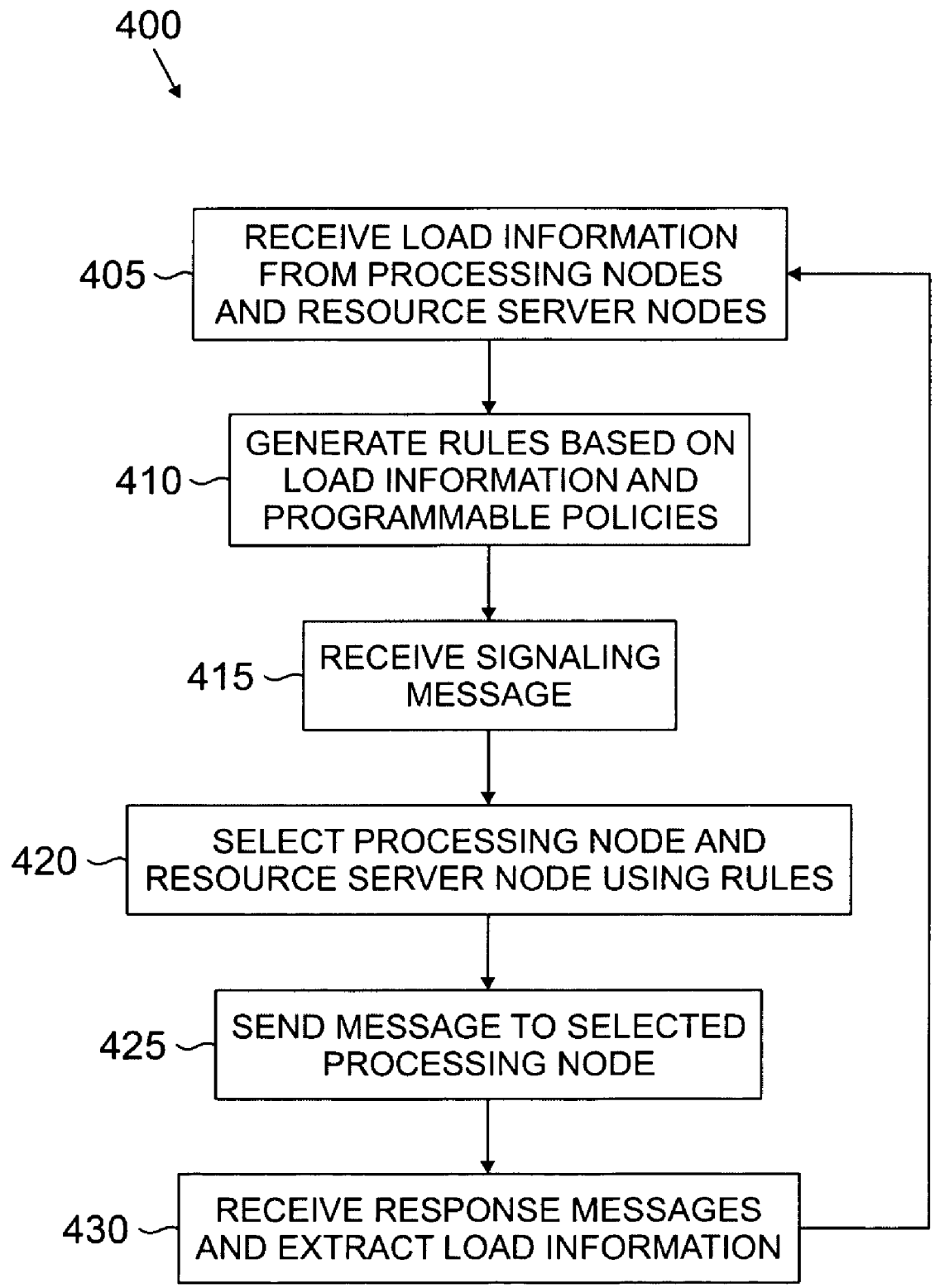
FIG. 4 is a flow diagram illustrating the operation of the load-sharing manager to distribute signaling messages within a scalable distributed call-processing system according to the principles of the present invention.

FIG. 4 depicts flow diagram 400, which illustrates the operation of load-sharing manager 250 to distribute signaling messages 205 within a scalable distributed call-processing system 200 according to the principles of the present invention. Initially, the load-sharing manager 250 receives loading information 345 from the processing nodes 221-222 and resource server nodes 261-262 within the call-processing system 200 (process step 405). From the loading information 345 and programmable policies 315, the load-sharing manager 250 generates rules 350 for distributing signaling messages 205 to the processing nodes 221-222 and assigning resource server nodes 261-262 for the signaling messages (process step 410).

At some point, a call request (signaling message) 205 arrives at load-sharing manager 250 (process step 415). Load-sharing manager 250 selects the optimum processing node (e.g., processing node 221) and optimum resource server node (e.g., resource serve node 261) for the signaling message 205 based on the type of signaling message 205 and generated rules 350 (process step 420). The signaling message 205 is then routed to the selected processing node 221 where the message 205 is processed using the selected resource server node (process step 425). Load-sharing manager 250 then receives response messages from processing nodes and/or from resource server nodes and extracts load information from the response messages (process step 430), and the process repeats from process step 405.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, a telecommunication node including a scalable call-processing system, said call-processing system comprising:

processing nodes operable to process signaling messages, each of said processing nodes configured to monitor a respective loading factor and produce respective real-time loading information;

resource server nodes operable to provide resources to said processing nodes, each of said resource server nodes configured to monitor a respective loading factor and produce respective real-time loading information, wherein said resource server nodes are further operable to determine which of said signaling messages are related signaling messages; and a load-sharing manager connected to receive said real-time loading information from each of said processing nodes and each of said resource server nodes, said load-sharing manager further connected to receive said signaling messages and distribute said signaling messages to said processing nodes for processing using said resource server nodes based on load-sharing rules generated using programmable policies and said real-time loading information, wherein said related signaling messages are routed to a single processing node.

2. The system as set forth in claim 1 wherein said programmable policies includes a threshold for said real-time loading information associated with one or more of said processing nodes and said resource server nodes.

3. The system as set forth in claim 1 wherein said real-time loading information for said processing nodes is appended to response messages sent from said processing nodes to said load-sharing manager.

4. The system as set forth in claim 3 wherein said real-time loading information for said resource server nodes is appended to response messages sent from said processing nodes or said resource server nodes to said load-sharing manager.

5. The system as set forth in claim 4 wherein said load-sharing manager further comprises:

a distribution controller connected to receive said signaling messages and distribute said signaling messages to said processing nodes using said load-sharing rules;

a rules generator configured to receive said programmable policies and said real-time loading information for each of said processing nodes and each of said resource server nodes and to generate said load-sharing rules there from; and a load analyzer operable to receive said response messages, extract said real-time loading information from said response messages and provide said real-time loading information to said rules generator.

6. The system as set forth in claim 1 wherein said load-sharing manager is configured to select one of said processing nodes and one or more of said resource server nodes for one of said signaling messages based on said load-sharing rules.

7. The system as set forth in claim 1 wherein each of said processing nodes comprises substantially the same processing logic and provides substantially the same functionality.

8. The system as set forth in claim 1 wherein each of said resource server nodes provides a different resource.

9. The system as set forth in claim 1 wherein two or more of said resource server nodes provides the same resource.

10. The system as set forth in claim 1 wherein each of said resource server nodes is useable by more than one of said processing nodes.

11. The system as set forth in claim 1 wherein said telecommunication node is a switch, router or a distributed call server.

12. A telecommunications node comprising a load-sharing manager connected to multiple processing nodes in a distributed call-processing system, each one of said multiple processing nodes capable of processing signaling messages using one or more of multiple resource server nodes operable to provide resources to said processing nodes, said load-sharing manager comprising:

a distribution controller connected to receive said signaling messages and distribute said signaling messages to said processing nodes using load-sharing rules, wherein said distribution controller is configured to determine which of said signaling messages are related signaling messages, and routes said related signaling message to a single processing node;

a rules generator configured to receive programmable policies and real-time loading information for each of said processing nodes and each of said resource server nodes and to generate said load-sharing rules therefrom; and a load analyzer operable to receive a response message including said real-time loading information from one of said processing nodes or one of said resource server nodes, extract said real-time loading information from said response message and provide said real-time loading information to said rules generator.

13. The load-sharing manager as set forth in claim 12 wherein said programmable policies includes a threshold for said real-time loading information associated with one or more of said processing nodes and said resource server nodes.

14. The load-sharing manager as set forth in claim 12 wherein said real-time loading information for a first one of said processing nodes is appended to a first response message sent from said first processing node.

15. The load-sharing manager as set forth in claim 14 wherein said real-time loading information for a first one of said resource server nodes is appended to a second response message sent from one of said processing nodes or said first resource server node.

16. The load-sharing manager as set forth in claim 12 wherein said distribution controller is configured to select one of said processing nodes and one of said resource server nodes for one of said signaling messages based on said real-time loading information associated with each of said processing nodes and each of said resource server nodes and said load-sharing rules.

17. For use in a telecommunication node capable of processing signaling messages in a distributed call-processing system including multiple processing nodes for processing said signaling messages using one or more of multiple resource server nodes operable to provide resources to said processing nodes, a method of distributing said signaling messages to said processing nodes, the method comprising the steps of:

receiving real-time loading information for each of said processing nodes and each of said resource server nodes;

generating load-sharing rules based on said real-time loading information and programmable policies;

receiving a signaling message;

determining which of said signaling messages are related signaling messages; and selecting one of said processing nodes and one or more of said resource server nodes for said received signaling message using said load-sharing rules.

18. The method as set forth in claim 17 further comprising the step of:

providing a threshold for said real-time loading information associated with one or more of said processing nodes and said resource server nodes in said programmable policies.

19. The method as set forth in claim 17 wherein said step of receiving said real-time loading information further comprises the step of:

receiving said real-time loading information for said processing nodes appended to response messages sent from said processing nodes.

20. The method as set forth in claim 19 wherein said step or receiving said real-time loading information further comprises the step of:

receiving said real-time loading information for said resource server nodes appended to response messages sent from said processing nodes or said resource server nodes.

* * * * *